UNITED STATES PATENT OFFICE.

JACOB E. BLOOM, OF NEW YORK, N. Y.

VEGETABLE AND OTHER FOOD PRODUCTS AND METHOD OF MAKING THE SAME.

No. 825,888.      Specification of Letters Patent.      Patented July 17, 1906.

Application filed August 1, 1904. Serial No. 219,107.

*To all whom it may concern:*

Be it known that I, JACOB E. BLOOM, a citizen of the United States, residing at New York, in the county of New York and State of New York, have invented certain new and useful Improvements in Vegetable and other Food Products and Methods of Making the Same; and I do declare the following to be a full, clear, and exact description of the invention, such as will enable others skilled in the art to which it appertains to make and use the same.

The fat contents of foods for man, including the invisible oils of usual foods, as also fats added in preparing a food product, are not homogeneous chemical compounds, but are mainly mixtures of various triglycerids of fatty acids, principally olein, palmitin, and stearin in varying proportions, which as a rule do not at all approximate the proportions of the like proximate constituents of human adipose tissue fat, wherein the oil consumed is mostly finally assimilated. The more nearly an oil or fat consumed approximates the proportions of olein, palmitin, and stearin as found in the human system the more easily is it digested and absorbed and the more nearly wholly is it assimilated, and, moreover, when in such proportions the oil is always liquid in the stomach and bowels at the body temperature of about 37 7/9° centigrade, which facilitates ease of digestion.

Heretofore in the preparation of foods for a suitable diet scientists have not practically considered the invisible fats and oils found in most foodstuffs and have failed to distinguish the same, as also culinary fats, as regards their several principal proximate constituents—to wit, olein, palmitin, and stearin—and have merely set forth that a stated amount of fats, without regard to their proximate constituents, was requisite for a suitable daily diet, and in preparing or cooking any food product as per any recipe for a day's diet, such has merely called for a stated amount of fat—such as suet, lard, olive-oil, &c.—which vary widely as regards said proximate constituents, and the character and amount of said proximate constituents of the oil or fat in the foodstuff itself have been uniformly ignored.

At present food preparations are made according to some accepted recipe which prescribes the method of preparation including the amounts of sundry native food materials. I call each of the latter a "foodstuff," and the preparation from one or more thereof as per my recipe I call a "food product." In all such present methods, whether the recipe or method of preparing prescribes the addition of fat or not, there is no consideration given to the amount of the invisible fats or oils existing in many foodstuffs used nor of the proximate constituents thereof nor of the proximate constituents of any additional fat or oil called for by the recipe. This is objectionable for the reason that the resulting food product generally contains an excess of palmitin or stearin, or both, which obstructs digestion, or the fat in the products has not the proximate constituents of oelin, palmitin, and stearin in the proportion to insure a liquid state in the stomach, nor the proportions in which they are finally assimilated in the system.

My invention, which is the result of physiological and chemical investigations, has for its object the preparation of food products for man, whereof the fat content will be free from the aforesaid defects, and the fats will be most easily digestible, absorbable, and assimilable, and which will be freed from the excess of solid fats, stearin, and palmitin ordinarily found in food products, thereby avoiding the useless work and waste of energy incidental to their elimination in and from the system, which energy is thereby rendered available for concentration upon the digestion of other food, and many ills incidental to or resulting from such excesses are avoided.

To this end my invention consists in a process of so treating and preparing food products containing oils or fats that the resulting oil content, whether visible or invisible, of the whole food product shall analogize human fat both in the kind and approximate proportions of its proximate constituents, olein, palmitin, and stearin.

The human fat or oil of an adult upon careful analysis was found to contain about 86.21 per cent. olein and about 7.83 per cent. palmitin and about 1.93 per cent. stearin, and which I call "adult-oil formula," and the fat or oil of a child was found to contain about 65.04 per cent. olein and about 27.81 per cent. palmitin and about 3.15 per cent. stearin, and which I call "child-oil" formula, the remainder comprising minute quantities of caproin, myristin, and other undetermined triglycerids of fatty acids. The said percentages vary in oils from various parts of the body and for different ages, and quantitative analysis thereof and the aforesaid constitute, respectively, the oil formulas to be attained in the food product cooked with my improved culinary oils. It is to be understood that I do not restrict myself to the particular child or adult oil formulas herein used, as the scope of my invention covers all formulas and analyses of human fat as regards the olein, palmitin, and stearin content thereof. In the said adult-oil formula the relative proportions of olein, palmitin, and stearin considered without reference to other minor fats are approximately as follows:

$$\frac{86.21}{86.21 + 7.83 + 1.93 = 95.97} = 89.93 \text{ olein,}$$

$$\frac{7.83}{93.97} = 8.16 \text{ palmitin,}$$

and $$\frac{1.93}{95.97} = 2.01 \text{ stearin.}$$

In said child-oil formula the analogous relative proportions are approximately $$\frac{65.04}{65.04 + 27.81 + 3.15 = 96} = 67.75 \text{ olein,}$$

$$\frac{27.81}{96} = 28.97 \text{ palmitin,}$$

and $$\frac{3.15}{96} = 3.28 \text{ stearin.}$$

To carry out my invention, first I extract by methods well known to chemists and determine the amount of oil, especially invisible oil, in each foodstuff to be used as per the recipe in making the food product, or as an alternative step I extract and determine the amount or weight of oil in a food product prepared as per said recipe, but prepared without the additional pure fats or oils, if there be such provided for in the recipe, and in either case I determine by well-known methods the approximate percentage of olein, palmitin, and stearin in said amount of extracted oil.

Secondly, I prepare a culinary oil or oils comprising such an amount of olein or palmitin or stearin or any one, two, or all thereof that when same is compounded or combined by mixing or cooking or otherwise with the oil in the foodstuff or foodstuffs, respectively, whose oil content has been determined as aforesaid, then the resulting oil in the whole food product shall comprise an amount of olein, palmitin, and stearin in the approximate proportion respectively as found in the above or other predetermined oil formula. Such culinary oils are preferably prepared as fully described in Letters Patent No. 782,821 for process of preparing oils for edible and other purposes, granted to me February 21, 1905, excepting substituting the culinary-oil formulas as herein described.

Thirdly, I then incorporate the said amount of culinary oil or oils with the foodstuff in the customary manner or as hereinafter described, and where the recipe calls for a stated amount of fat or oil which exceeds said amount of culinary oil I also add such excess in the form of an oil whose olein, palmitin, and stearin content approximates that of human fat—such, for example, as those described in my application for Letters Patent aforesaid or in Letters Patent No. 782,820 for fatty edible preparation, granted to me February 21, 1905, and I omit and dispense with the fat called for by the recipe, substituting the aforesaid oils in the place thereof.

In place of incorporating the oil or oils with each foodstuff I prefer to first compound the said culinary oils, and where water or milk or other liquid is called for by the recipe I prefer to make an emulsion of such liquid and oil or a mixture approximating an emulsion and then preferably incorporate such emulsion with the foodstuff in the manner now customary with cooks in incorporating the water or milk.

My method of preparing and manufacturing food products or preparations is further set forth in detail by the following examples, to wit:

Example No. 1: To prepare a food product from cornmeal, such as corn-bread or hoe-cake, the usual recipe for corn-bread contains stated amounts, first, of cornmeal and, second, of lard or butter or other fat, and, third, of salt, and with sufficient warm water to make a thick batter. One recipe in the *Manual for Army Cooks*, published by the authority of the Secretary of War for use in the Army of the United States, 1896, further states: "Put meal in a deep dish, mix in the salt, pour in sufficient warm water to make a thick batter, last add the melted lard, (or other fat,) beat thoroughly, and bake in a quick oven. By the addition of more warm water the batter can be thinned down and a griddle-cake made from above recipe." In my method I first determine the amount of invisible oil in the cornmeal, which in the best qualities averages six per cent. of the weight of the meal. This percentage varies in different cornmeals, depending upon the variety of seeds of the maize-plant, *Zea mays*, from which the meal was ground. Such percentage varies from four to eight per cent. By due analysis maize-oil was found to contain about 41.93 per cent. of olein and 4.21 per cent. of palmitin and no stearin. If now for purposes of calculation I take sixteen hundred and sixty-six pounds of cornmeal, which contains

| | | | Olein. | Palmitin. | Stearin. |
|---|---|---|---|---|---|
| 100 | lbs. | maize-oil, comprising and mix therewith a culinary oil of | 41.93 lbs. | +4.21 | +0 |
| 53 | " | back lard-oil, to wit: and | 47.7 " | +3.39 | 1.91 lbs. |
| .6 | " | lard stearin | .05 | .44 | .11 " |
| 153.6 | " | total oils, comprising | 89.68 lbs. | 8.04 | 1.02 lbs. |

This proportion approximates that of the olein, palmitin, and stearin of the above adult-oil formula. It shows that by compounding the aforesaid lard-oil and stearin I obtain an oil which when incorporated with the cornmeal constitutes the oil in the whole food product of the adult formula, which the above figures show should be used at the rate of .51 of an ounce or roughly one-half ounce to the pound of cornmeal in the above or other recipe. The above recipe usually calls for more than one-half ounce of oil to the pound of meal, and for the excess over said one-half ounce per pound I use a fat or oil of the adult formula aforesaid. In place of incorporating the said culinary oil with the meal direct I can and in many cases prefer to compound it with the said excess of edible oil and thereafter incorporate the whole mixture with the meal. In place of adding the fat or oil lastly to the batter, as per the recipe, I prefer before making the batter to make an emulsion of the oil and warm water (or other liquid) or a mixture approximating an emulsion of the oil and the water, and which mixture I mix forthwith as quickly as made with the cornmeal to make the batter, and thus a more uniform mixing of the fat or oil with the meal is secured. I omit the fat called for by the recipe, having substituted a like amount of other oils, as above described. If the cornbread is intended for consumption by very young children, I prefer to make a corn culinary oil corresponding in composition to the childs' oil formula aforesaid, as per a formula obtained in a manner analogous to above, and for the excess use an oil of the child-oil formula, made as described in the aforesaid applications for patent.

Example No. 2: To prepare a food product to two or more foodstuffs containing invisible fats by my improved method, I cite my following Example No. 2, to wit: the preparation of what is commonly known as "almond pudding" for adult use. A standard recipe for almond pudding for the diabetic is the following: Take (A) one-fourth pound almond-flour and (B) two eggs and (C) one-fourth pound butter and (D) three tabloids of saccharin. For the diabetic dissolve latter in a tablespoonful of brandy, (for non-diabetic substitute sugar.) Warm the butter, beat in the almond-flour and yoke of the eggs, adding the dissolved saccharin, whisk the whites of the eggs into a stiff froth, beat all together, put into molds, bake in a quick oven.

Of the foregoing foodstuffs both the almond-flour and the eggs contain invisible fats. To determine the amount of culinary oil to be added in lieu of the above butter in accordance with my process, I pursue one of the two following methods A or B, to wit: method A, wherein I determine the amount and character of the culinary oil for each separate foodstuff—to wit, the almond-flour and the eggs—and the alternative method B, wherein I determine the amount and the character of the culinary oil requisite to be added to a mixture of the several foodstuffs—to wit, almond-flour and eggs and exclusive of the butter.

Taking first the method A:

First. In order to bring the fat content of the one-fourth pound of almond-flour to approximate the adult oil formula, I determine the amount of oil in almond-meal to be fifty per cent. This average is confirmed by Bulletin No. 28 of 1902, page 174 of United States Department of Agriculture, Office of Experiment Stations, on the *Chemical Composition of American Food Materials*. If now I mix

| | | Olein. | Palmitin. | Stearin. |
|---|---|---|---|---|
| 1 oz. oil of sweet almond = | | .878 oz. +: | .60 oz. +: | 0 |
| .04 " oleo beef stearin = | | | .02 +: | .02 |
| 1.04 oz. total oil, comprising | | .878 oz. +: | .08 | .02 | which approximates the proportions of the adult oil formula. Therefore calculating one-fourth pound sweet almond-flour to contain one-eighth pound oil, or two ounces, I attain the requisite proportion by adding .08 ounces of oleo beef stearin, which constitute a culinary fat for almond-meal only.

Second. In order to bring the oil content of the food product as regards the two eggs to approximate the adult oil formula, I add thereto an oil of such composition that when added to eggs will bring the olein, palmitin, and stearin content thereof into approximately the proportions of the like ingredients of human fat considering the hydroxystearin of the egg as so much stearin. Such an oil is illustrated by the egg culinary oils described in a companion application filed simultaneously herewith, Serial No. 219,106. For the two eggs in the above example I add 1.71 ounces of the egg culinary oil No. 2—to wit, the depalmitinized olive-oil No. 3, being olive-oil from which palmitin has been removed until the ratio of olein to palmitin is about twelve to one in remainder.

Third. From the preceding two items it will be seen that I have provided about 1.79 + ounces of oils. The recipe calls for four ounces. I therefore add 2.21 ounces of an oil of the adult oil formula prepared, preferably, as described in my above patent applications, giving preference to Example No. 12 of Letters Patent No. 782,821 for process of preparing oils for edible and other purposes, granted to me February 21, 1905, which is prepared from oil of sweet almonds and cow-butter. I omit the one-fourth pound butter called for by the recipe.

In place of adding the said culinary oils respectively to each of the foodstuffs I prefer to first compound the same together with the last-named oil and then incorporate the same in the preparation in the manner or in lieu of the butter called for by said recipe, or preferably in the manner by making an emulsion and mix same with the meal, as described in my above Example No. 1.

Method B: First. In order to determine the culinary oil formula, I prepare the almond pudding in accordance with the above recipe, omitting the fats, in this case the butter, (and in other cases such as a meat preparation, omitting visible fats which can be cut away.) I thereupon extract by well-known methods the oil from such preliminary preparation and determine the olein, palmitin, and stearin content approximately, and therefrom I calculate and determine the oil formula of an oil which when added thereto shall constitute the oil of the whole preparation of the adult oil formula or child oil formula or other preferred formula. For any excess of fat called for by this or any other recipe over the amount of such oil I use one of the oil aforesaid which analogize human fat. Thus in this method I first prepare an almond pudding according to the above recipe, omitting the butter. The same contains approximately 2.43 ounces of oil, comprising 2.1 ounces olein, .16 ounce palmitin, and .03 ounce stearin and hydroxystearin. Therefore I mix with

|  |  | Olein. | Palmitin. | Stearin. |
|---|---|---|---|---|
| 2.43 oz. | invisible oil = | 2.1 oz. + | .16 oz. + | .03 oz. |
| 1.5 " | sweet-almond oil = | 1.317 " + | .09 " + | :0 |
| .1 " | oleo stearin |  | .054 " + | .946 " |
| 3.93 " | total oil in products = | 3.417 oz. + | .304 oz. + | .076 |
|  | Equals proportions | 89.6 | :8 | :2 |

The said compound oil, composed of one and one-half ounces sweet-almond oil and .1 ounce oleo stearin, constitutes a novel culinary oil, and whereof 1.6 ounces must be used with the above amounts of almond-meal and eggs set forth in formula to constitute the oil as desired. As the recipe calls for four ounces of butter-fat, I use in place thereof the aforesaid 1.6 ounces culinary oil and an additional 2.4 ounces of oil, preferably the adult oil formula described above, and thereby the oil content of the entire almond pudding has the proportion of olein, palmitin, and stearin as found in human fat.

While I have illustrated one embodiment of my invention as applied to maize and another as applied to almond-flour, my invention is applicable to the treatment of ground and unground seeds and nuts generally, not only cereals, including maize, wheat, rye, barley, oats, rice, millet, and the like, but to legumes, including peas, beans, and the like, and also to any vegetable or fruit, fresh or evaporated, or other substance containing invisible oil impracticable or difficult to remove.

In all cases in carrying out my improvement I first determine by well-known methods the approximate amount of fat or oil in the seed or seed flour or foodstuff proposed to be used, and I thereupon determine approximately by well-known methods the approximate amount of olein, palmitin, and stearin in the oil or fat of the particular foodstuff. I then calculate the amount of olein or palmitin or stearin which should be added to the said food material, so that when thus added or intermixed then the olein, palmitin, and stearin of the whole shall be of the same proportion as set forth in the above adult oil formula if same be intended for consumption by adult, or in the above child oil formula if the same be intended for consumption by children, and the percentages of said amounts to be added constitute my culinary oil formulas, and accordingly I prepare a separate culinary oil for each distinct variety of foodstuff. I do not attempt to make a separate analysis each time I use the same foodstuff; but I prefer to analyze a number of the same species of foodstuff in any particular district of growth and obtain a fair average of the above-stated amounts of oil in the foodstuffs and percentages of amounts of olein, palmitin, and stearin in such oil. Thus I prepare one culinary oil for cooking with cornmeal, another for cooking spring-wheat flour, another for cooking winter-wheat flour, another for beans, and where such coming from different sections of the country vary materially I vary my compound accordingly; but the method of preparation which I pursue is alike for all.

It is to be understood that fats are the equivalents of oils for use in my process and that where fats are mentioned oils may be used and vice versa. It is also to be understood that where "vegetables" are referred to in my process cereals, nuts, legumes, and fruits may be employed, they being equivalents of vegetables in the process hereinbefore described.

Having thus described my invention, what I claim, and desire to secure by Letters Patent, is—

1. The process of preparing food products from foodstuffs which consists in determining the composition of the fat content thereof as regards olein, palmitin and stearin and in the addition to such foodstuffs of fat of such composition as to bring the olein, palmitin and stearin of the fat content of the resulting products into approximately the proportions in which the said proximate principles exist in human fat.

2. The process of preparing food products which consists in incorporating with foodstuffs comprising invisible oils an oil of predetermined composition requisite to constitute the olein, palmitin and stearin content in the resulting food product in the proportion approximating the proportion of the like constituents in human fat.

3. The process of preparing seed food products which consists in adding to the ground or unground ingredients of the seeds employed a fat containing olein, palmitin and stearin in such proportions as to bring these proximate principles in the entire fat content of the resultant product into approximately the proportion in which they exist in human fat.

4. The process of preparing food products from foodstuffs which consists in determining the composition of the fat content thereof as regards olein, palmitin and stearin and in adding to the foodstuff or foodstuffs employed a fat of such composition as to bring the olein, palmitin and stearin in the fat content of the food thereby produced into approximately the proportions in which they exist in human fat and finally in adding to this product a fat containing olein, palmitin and stearin in approximately the proportions in which these proximate principles exist in human fat.

5. The process of preparing food products from foodstuffs which consists in adding thereto a fat containing olein, palmitin and stearin in such amounts as to bring these proximate principles in the fat content of the food thereby produced into the proportions in which they exist in human fat and in adding thereto materials whose fat content contains olein, palmitin and stearin in the proportions in which these proximate principles exist in human fat.

6. The process of preparing seed food products which consists in determining the proportion of fat contained in the ground or unground ingredients of the seeds employed and the composition of said fat as regards olein, palmitin and stearin and in adding thereto a fat containing olein, palmitin and stearin in such amounts as to bring these proximate principles in the fat content of the resulting product into the proportions in which they exist in human fat and finally in adding to this product a fat containing olein, palmitin and stearin in the proportions in which they exist in human fat.

7. A food product containing vegetable materials which embody invisible fats, said product having a fat content in which olein, palmitin and stearin exist in approximately the same proportions as in human fat.

8. A food product containing ingredients of plant-seeds which embody invisible fats, said product having a fat content in which the olein, palmitin and stearin exist in approximately the same proportions as in human fat.

9. A food product containing cornmeal, the said product having a fat content comprising olein, palmitin and stearin in proportions approximating the proportions of the like constituents as found in human fat.

In testimony whereof I affix my signature in presence of two witnesses.

JACOB E. BLOOM.

Witnesses:
   Jos. L. LOWENTHALL,
   HARRY J. LASK.